(12) United States Patent
Kelty

(10) Patent No.: US 7,752,145 B2
(45) Date of Patent: Jul. 6, 2010

(54) CONSUMER-SITED POWER MANAGEMENT SYSTEM AND METHOD

(75) Inventor: Kurt Kelty, Palo Alto, CA (US)

(73) Assignee: Panasonic Corporation, Osaka (JP)

( * ) Notice: Subject to any disclaimer, the term of this patent is extended or adjusted under 35 U.S.C. 154(b) by 865 days.

(21) Appl. No.: 11/353,137

(22) Filed: Feb. 14, 2006

(65) Prior Publication Data

US 2007/0200433 A1    Aug. 30, 2007

(51) Int. Cl.
*G01R 11/56* (2006.01)

(52) U.S. Cl. .............................. 705/412; 705/1; 705/63; 709/223; 709/224; 707/203; 307/66; 307/25

(58) Field of Classification Search .................... 705/63, 705/412; 709/223, 224; 707/203; 307/66, 307/25
See application file for complete search history.

(56) References Cited

U.S. PATENT DOCUMENTS

| | | | |
|---|---|---|---|
| 4,998,024 A * | 3/1991 | Kirk et al. ...................... 307/40 |
| 6,437,692 B1 * | 8/2002 | Petite et al. .................. 340/540 |
| 6,452,289 B1 * | 9/2002 | Lansberry et al. ............. 307/25 |
| 6,772,075 B2 | 8/2004 | Parsons et al. |
| 6,785,592 B1 | 8/2004 | Smith et al. |
| 6,882,128 B1 * | 4/2005 | Rahmel et al. ............... 320/101 |
| 6,882,904 B1 | 4/2005 | Petrie et al. |
| 6,900,556 B2 | 5/2005 | Provanzana et al. |
| 2004/0036360 A1 | 2/2004 | McCombs |
| 2004/0051387 A1 | 3/2004 | Lasseter et al. |
| 2004/0078153 A1 | 4/2004 | Bartone et al. |
| 2004/0211182 A1 * | 10/2004 | Gould .......................... 60/643 |
| 2005/0071093 A1 | 3/2005 | Stefan |

FOREIGN PATENT DOCUMENTS

WO    WO 2005/033964 A1    4/2005

* cited by examiner

*Primary Examiner*—Vanel Frenel
(74) *Attorney, Agent, or Firm*—McDermott Will & Emery LLP

(57) ABSTRACT

A system and method provide emergency back-up power for communications, security and other systems of an electric power consumer, and for peak-shifting of the electrical load so that electricity is generated and stored when demand is low, and the stored power is used when demand is high. Embodiments include providing an electric power management device having a battery and a communication system at the premises of a consumer of electricity, and connecting the power management device to an electric power provider. The battery is charged at an off-peak time when a demand for electricity is low, as determined by the electric power provider; and discharged to provide electricity to the consumer at a time when the demand for electricity is high, as determined by the electric power provider. The charging and discharging is controlled by the electric power provider.

27 Claims, 2 Drawing Sheets

CONSUMER-SITED POWER MANAGEMENT SYSTEM AND METHOD

FIELD OF THE INVENTION

The present invention relates to management and distribution of electric power. The present invention has particular applicability to raising the efficiency of the power grid.

BACKGROUND ART

Modern electric power systems usually include "peaker plants", which are power generating stations used only at peak times when the demand for power is high. Such peaker plants are not used regularly, and typically burn fuel, such as coal or diesel, which is relatively "dirty" from an environmental standpoint. Because peaker plants require a large capital expenditure to construct and are rarely used, they reduce the overall efficiency of the power company's capital equipment. However, under the current state of the art, peaker plants are necessary to ensure an adequate power supply at times of high demand.

From the point of view of the consumer (or "customer"), power purchased during peak times is more expensive than power purchased at off-peak times, when demand is low. The high cost of power at peak times is partially due to the necessity of building, maintaining and operating peaker plants. However, since the power customer cannot store power, they have no choice in the matter, and must buy power when they need to use it.

Moreover, virtually all communications systems, security systems, food storage systems, etc. at a customer's home or business require electrical power to operate. When a power failure occurs, these systems become inoperative, which can result in damage to the equipment and inconvenience or even danger to the customer.

There exists a need for an apparatus and methodology for reducing the need for building peaker plants, thereby reducing power production costs. There also exists a need for an apparatus and methodology for providing continuous reliable power to the customer.

SUMMARY OF THE INVENTION

An advantage of the present invention is emergency back-up power for communications, security and other systems of an electric power consumer. Another advantage of the present invention is peak-shifting of the electrical load so that electricity is generated and stored when demand is low, and the stored power is used when demand is high, resulting in lower power costs for the customer, and lower capital cost expenditures for the power company (or "utility").

Additional advantages and other features of the present invention will be set forth in part in the description which follows and in part will become apparent to those having ordinary skill in the art upon examination of the following or may be learned from the practice of the invention. The advantages of the invention may be realized and obtained as particularly pointed out in the appended claims.

According to the present invention, the foregoing and other advantages are achieved in part by a method comprising the steps of providing an electric power management device having a battery and a communication system at the premises of a consumer of electricity, and connecting the power management device to an electric power provider. The battery is charged at an off-peak time when a demand for electricity is low, as determined by the electric power provider; and discharged to provide electricity to the consumer at a time when the demand for electricity is high, as determined by the electric power provider. The charging and discharging is controlled by the electric power provider.

Another aspect of the present invention is a system comprising an electric power management device having a battery, a processor and a communication system; and a central controller in two-way communication with the power management device via the communication system of the power management device. The central controller is configured to monitor the charge status of the battery, charge the battery at an off-peak time when a demand for electricity is low, as determined by the electric power provider, and discharge the battery to provide electricity to the consumer at a time when the demand for electricity is high, as determined by the electric power provider.

Additional advantages of the present invention will become readily apparent to those skilled in this art from the following detailed description, wherein only the preferred embodiment of the present invention is shown and described, simply by way of illustration of the best mode contemplated for carrying out the present invention. As will be realized, the present invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent like elements throughout, and wherein.

DESCRIPTION OF THE INVENTION

Figure 1:
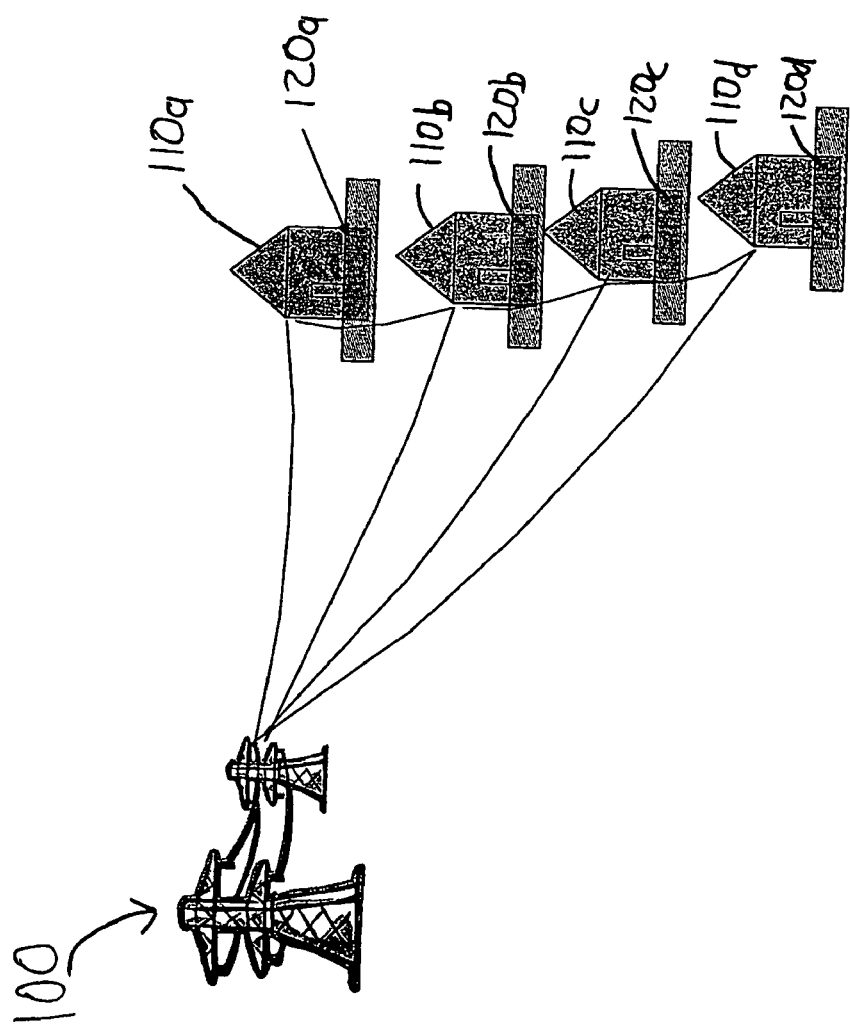
FIG. 1 is an overview of a conventional power grid connected to an electric power management device of an embodiment of the present invention.

Conventional methodologies for power distribution require peaker plants to ensure an adequate supply of electricity during times of high demand, which increases the cost of electricity to the utility and the customer, raises levels of environmental pollution, and reduces the efficiency of the utility's capital equipment. Furthermore, conventional power distribution systems do not include emergency power provisions for the premises of a customer. The present invention addresses and solves these problems stemming from conventional power distribution systems.

According to the present invention, an electric power management device (also known as a "reliability box") having a battery and a communication system is provided at the premises of a consumer of electricity (the "customer"). The power management device is connected to an electric power provider, which charges the battery at an off-peak time when a demand for electricity is low, and discharges the battery to provide electricity to the consumer at a time when the demand for electricity is high, as determined by the electric power provider. The charging and discharging are both controlled by the electric power provider, as the power management device provides the power provider real time information regarding power consumption and power quality. Additionally, a processor is included in the power management device programmable by the consumer to cause a minimum charge to be present in the battery, to provide back-up power in case of a power outage. The power management device may also be programmed to provide power to a local area utility grid in case of a power outage.

The consumer-sited power management system and method of the present invention provides the customer emergency back-up power to protect equipment such as phone systems, computer, routers, security systems, refrigerators, etc. from sudden shut down or damage. The present invention also provides the customer lower electricity costs, because they are buying power at low-demand times rather than peak times. Additionally, utilities can afford to charge lower rates generally, due to lower capital costs, because peaker plant construction can be deferred. The customer also gains environmental benefits by the present invention's reduction of peaker plant load, since dirty peaker plants do not need to be constructed or operated.

Utilities benefit from the present invention as well as the customer, since the present invention enables control of the electricity supply during peak usage periods via the discharge of the battery of the inventive reliability box. Specifically, the present invention improves the efficiency of the utility's capital equipment, because construction of rarely used peaker plants can be delayed. There are also environmental benefits from delaying construction and usage of peaker plants, which may result in emission credits to the utility. Further, the increased reliability of the system will result in less complaints resulting from power outage or power quality issues. Still further, the real time loading information provided by the present invention enables the utility to use their transmission grid more efficiently, thereby reducing stresses on the transmission grid.

The present invention will now be described in detail with reference to FIGS. 1 and 2. FIG. 1 is an overview of a conventional power grid connected to a microgrid of reliability boxes according to the present invention. The grid 100 is connected to customers 110a-d, each of which have a reliability box 120a-d according to the present invention installed inside a building, for example, in their basement or garage.

Figure 2:
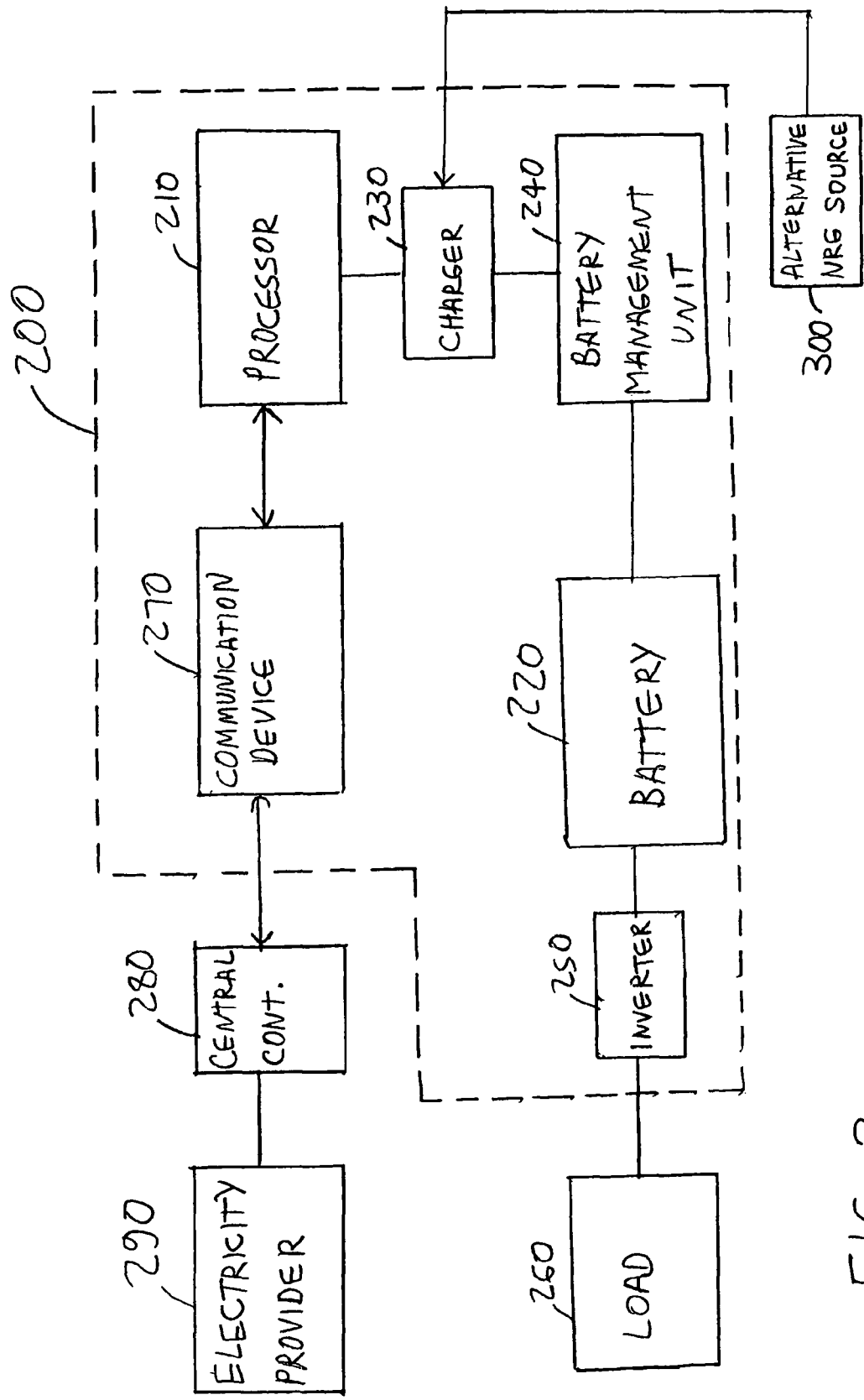
FIG. 2 is a block diagram of a consumer-sited power management system according to an embodiment of the present invention.

A more detailed view of a reliability box according to the present invention is shown in FIG. 2. Reliability box 200 comprises a conventional processor 210, which includes conventional logic controllers (e.g., PLCs), and a battery 220 for energy storage. Battery 220 is a high power density rechargeable battery, such as a sealed lead-acid, nickel metal hydride (NiMH), nickel cadmium (NiCd), nickel zinc (NiZn), air electrode, rechargeable alkaline manganese, iron-silver, silver-zinc, or lithium ion battery. High-capacity capacitive devices, such as supercapacitors, ultracapacitors, or capacitor banks can be provided instead of or in combination with a conventional battery to constitute battery 220. Battery 220 has a capacity of 1 to 10 KW, or 1-20 kWh.

Reliability box 200 further comprises a conventional charger 230 including an AC/DC inverter, such as the Xantrex SW, available from Xantrex of Burnaby, British Columbia. Charger 230 is connected to processor 210, which controls charger 230 as described hereinbelow. A conventional battery management unit (BMU) 240 is connected between charger 230 and battery 220 if the battery chemistry so requires. For example, if battery 220 is a lithium ion battery, BMU 240 can be a Model TI bq20z80, available from Texas Instruments of Dallas, Tex.; or a Model AT73C202, available from Atmel of San Jose, Calif. BMU 240 is for controlling a battery charge voltage or charge current, measuring a charge level, preventing overcharging, preventing over-discharging of battery 220. BMU 240 also shuts down battery 220 when the battery temperature reaches a predetermined level, to prevent operation of battery 220 at an excessively high temperature.

A conventional inverter 250, such as a Fronius IG 5100, available from Fronius of Germany, is connected between battery 220 and the customer's load 260. Load 260 is typically a circuit panel containing switches corresponding to the customer's telecommunications system, security system, computer system, refrigerator, air conditioning, furnace, etc.

Reliability box 200 further comprises a two-way communication device 270, such as a conventional modem or other device for converting digital signals into analog signals or vice-versa. Communication device 270 is connected to processor 210, and is also connected to a central controller 280 via a phone line, cable, direct electrical connection or through wireless means. Central controller 280 is operated outside the customer's premises by the electrical provider 290, such as a utility company, and can be a PC, server, hand-held or laptop device, multiprocessor system, microprocessor-based system, set-top box, networked PCs, mainframe computer, distributed computing environment, etc. Central controller 280 receives data from, and sends instructions to, processor 210 as explained hereinbelow.

In operation, processor 210 monitors the state of charge of battery 220, and sends this information to central controller 280 via communication device 270. Central controller 280 is configured to instruct processor 210 to charge battery 220 at an off-peak time when demand for electricity is low, as determined by electricity provider 290, and to discharge battery 220 to provide electricity to the customer when the demand for electricity is high, as determined by electricity provider 290.

Processor 210 allows the customer to set a minimum battery charge level (for back-up power) using a conventional personal computer (PC) or via the internet. Processor 210 is also configured to cause battery 220 to provide back-up power, in case of a power outage, to the customer or to a local area utility grid. For example, processor 210 can be programmed to cause reliability box 200 to provide back-up power to at least one of a telecommunications system of the customer, a security system of the customer, a refrigerator of the customer, lights of the customer, and a computer system of the customer. Processor 210 can also be configured to cause power stored in battery 220 to compensate for voltage sags.

Processor 210 is further configured to generate real time energy reports for electricity provider 290 and/or the customer, the energy reports including, for example, an electricity consumption report and a power quality report, the power quality report including at least one of voltage, current and impedance information. Central controller 280 is configured to predict failure of reliability box 200 based on the energy reports, and schedule maintenance of reliability box 200 based on the energy reports. Processor 210 can also be configured to generate a notification and send the notification to an emergency response agency using communication device 270 upon receiving a signal indicating a security issue. Such security issues can be a power outage, a security breach, a fire, a predetermined carbon monoxide level, or a predetermined temperature level. Thus, reliability box 200 can be used to enhance the customer's security.

In a further embodiment of the present invention, reliability box 200 is connected to an alternative energy source 300, such as a wind power generator, enabling battery 220 to be charged using electricity generated by the alternative energy source 300.

The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without resorting to the details specifically set forth. In other instances, well known processing structures have not been described in detail, in order not to unnecessarily obscure the present invention.

Only the preferred embodiment of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. A method comprising the steps of:
providing an electric power management device having a battery and a communication system at a premises of a consumer of electricity;
connecting the power management device to an electric power provider;
charging the battery at an off-peak time when a demand for electricity is low, as determined by the electric power provider; and
discharging the battery to provide electricity to the consumer at a time when the demand for electricity is high, as determined by the electric power provider;
wherein the charging and discharging is controlled by the electric power provider.

2. The method of claim 1, comprising providing the power management device inside a building.

3. The method of claim 1, comprising exchanging data between the electric power provider and the power management device via the communication system of the power management device.

4. The method of claim 3, wherein the electric power provider monitors a charge status of the battery.

5. The method of claim 3, comprising generating real time energy reports for at least one of the electric power provider and the consumer using data from the power management device, the energy reports including at least one of an electricity consumption report and a power quality report, the power quality report including at least one of voltage, current and impedance information.

6. The method of claim 5, comprising scheduling maintenance of the power management device based on the energy reports.

7. The method of claim 5, comprising predicting failure of the power management device based on the energy reports.

8. The method of claim 1, comprising connecting the power management device to a local area utility grid.

9. The method of claim 1, comprising:
providing a programmable processor in the power management device, the processor being programmable by the consumer; and
programming the processor to cause a predetermined minimum charge to be present in the battery.

10. The method of claim 9, comprising programming the processor to cause the power management device to provide back-up power for the consumer or for a local area utility grid, in case of a power outage.

11. The method of claim 10, comprising programming the processor to cause the power management device to provide back-up power to at least one of a telecommunications system of the consumer, a security system of the consumer, a refrigerator of the customer, lights of the customer, and a computer system of the consumer.

12. The method of claim 9, comprising programming the processor to generate a notification and send the notification using the communication system upon receiving a signal indicating a security issue.

13. The method of claim 12, wherein the security issue is at least one of a power outage, a security breach, a fire, a predetermined carbon monoxide level, and a predetermined temperature level.

14. The method of claim 13, wherein the notification is to an emergency response agency.

15. The method of claim 1, comprising utilizing power stored in the battery to compensate for voltage sags.

16. The method of claim 1, comprising connecting the power management device to an alternative energy source.

17. A system comprising:
an electric power management device having a battery, a processor and a communication system; and
a central controller in two-way communication with the power management device via the communication system of the power management device;
wherein the central controller is configured to:
monitor a charge status of the battery;
charge the battery at an off-peak time when a demand for electricity is low, as determined by an electric power provider; and
discharge the battery to provide electricity to a consumer at a time when the demand for electricity is high, as determined by the electric power provider.

18. The system of claim 17, wherein the processor is configured to cause a minimum charge to be present in the battery.

19. The system of claim 18, wherein the processor is configured to cause the battery to provide back-up power, in case of a power outage.

20. The system of claim 18, wherein the processor is configured to generate a notification and send the notification using the communication system upon receiving a signal indicating a security issue.

21. The system of claim 17, wherein the processor is configured to cause power stored in the battery to compensate for voltage sags.

22. The system of claim 17, wherein the processor is configured to generate real time energy reports for at least one of the electric power provider and the consumer, the energy reports including at least one of an electricity consumption report and a power quality report, the power quality report including at least one of voltage, current and impedance information.

23. The system of claim 22, wherein the central controller is configured to schedule maintenance of the power management device based on the energy reports.

24. The system of claim 17, further comprising a battery management unit (BMU) for controlling a battery charge voltage or charge current, measuring a charge level, preventing overcharging, preventing over-discharging, and preventing operation at an excessively high temperature.

25. The system of claim 24, wherein the BMU is for shutting down the battery when the temperature of the battery reaches a predetermined level.

26. The system of claim 17, wherein the battery comprises a high power density rechargeable battery.

27. The system of claim 17, wherein the battery comprises a high-capacity capacitive device.

* * * * *